(12) United States Patent
Wang et al.

(10) Patent No.: US 11,088,896 B2
(45) Date of Patent: Aug. 10, 2021

(54) DATA CHANNEL BETWEEN A CLIENT AND A RESTARTABLE SERVICE

(71) Applicant: VMware, Inc., Palo Alto, CA (US)

(72) Inventors: Wenguang Wang, Santa Clara, CA (US); Xiaoyun Gong, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 348 days.

(21) Appl. No.: 15/652,048

(22) Filed: Jul. 17, 2017

(65) Prior Publication Data

US 2019/0020533 A1   Jan. 17, 2019

(51) Int. Cl.
*G06F 15/16* (2006.01)
*H04L 12/24* (2006.01)
*G06F 9/455* (2018.01)
*G06F 16/901* (2019.01)
*G06F 16/903* (2019.01)
*H04L 29/14* (2006.01)
*H04L 12/26* (2006.01)
(Continued)

(52) U.S. Cl.
CPC ...... *H04L 41/0654* (2013.01); *G06F 9/45558* (2013.01); *G06F 16/9014* (2019.01); *G06F 16/90335* (2019.01); *H04L 43/0823* (2013.01); *H04L 69/40* (2013.01); *G06F 2009/45583* (2013.01); *G06F 2009/45595* (2013.01); *H04L 67/42* (2013.01); *H04L 69/329* (2013.01)

(58) Field of Classification Search
CPC ..... H04L 41/0654; H04L 69/40; H04L 67/42; G06F 16/90335; G06F 9/014; G06F 9/45558; G06F 2009/45583; G06F 2009/45595

USPC ......................................................... 709/223
See application file for complete search history.

(56) References Cited

U.S. PATENT DOCUMENTS 6,854,021 B1 * 2/2005 Schmidt ................ G06F 3/0613
                                                    709/236
2004/0078659 A1 * 4/2004 Hickson ................ G06F 16/10
                                                      714/17

(Continued)

OTHER PUBLICATIONS

M. Mazumder and T. Braje, "Safe Client/Server Web Development with Haskell," 2016 IEEE Cybersecurity Development (SecDev), 2016, pp. 150-150 (Year: 2016).*

(Continued)

*Primary Examiner* — Oscar A Louie
*Assistant Examiner* — Messeret F Gebre
(74) *Attorney, Agent, or Firm* — Patterson + Sheridan, LLP

(57) ABSTRACT

A data communication channel between a client and a service is preserved through a failure of the server by maintaining a request log and an inflight request queue in a protected memory region that preserves the contents of the request log and the inflight request queue even when the service encounters a failure. The method of restarting the data communication channel includes, upon the service being restarted following the failure of the service, determining whether the request log contains requests and, if so, copying the requests from the request log into the in-flight request queue and then removing the copied requests from the request log. The requests in the in-flight request queue, which include any that were in the in-flight request queue at the time of the failure of the service and any that were copied from the request log, are then processed.

20 Claims, 9 Drawing Sheets

(51) Int. Cl.
  *H04L 29/06* (2006.01)
  *H04L 29/08* (2006.01)

(56) References Cited

U.S. PATENT DOCUMENTS

| | | | | |
|---|---|---|---|---|
| 2004/0250030 | A1* | 12/2004 | Ji | G06F 3/0613 711/162 |
| 2007/0088970 | A1* | 4/2007 | Buxton | G06F 11/1471 714/2 |
| 2007/0130303 | A1* | 6/2007 | Anna | G06F 11/203 709/223 |
| 2008/0291937 | A1* | 11/2008 | Cheshire | H04L 47/10 370/429 |
| 2009/0177658 | A1* | 7/2009 | Brantner | G06F 16/2477 |
| 2013/0042156 | A1* | 2/2013 | Srinivasan | G06F 11/1443 714/54 |
| 2013/0332413 | A1* | 12/2013 | Yudenfriend | G06F 11/2082 707/611 |
| 2016/0070585 | A1* | 3/2016 | Tsirkin | G06F 9/45558 |
| 2017/0046234 | A1* | 2/2017 | Yang | G06F 11/1464 |
| 2017/0046270 | A1* | 2/2017 | Sharanhovich | G06F 9/544 |

OTHER PUBLICATIONS

Kanitkar, V., & Delis, A. (1999). Site selection for real-time client request handling doi:http://dx.doi.org/10.1109/ICDCS.1999.776531 (Year: 1999).*

Y. Labyad, M. Moughit and A. Haqiq, "Performance analysis and comparative study of voice over IP using hybrid codec," 2012 IEEE International Conference on Complex Systems (ICCS), 2012, pp. 1-6 (Year: 2012).*

R. Baldoni, C. Marchetti, R. Panella and L. Verde, "Handling FT-CORBA compliant interoperable object group references," Proceedings of the Seventh IEEE International Workshop on Object-Oriented Real-Time Dependable Systems. (WORDS 2002), 2002, pp. 37-44 (Year: 2002).*

Nadav Har'El et al., "Efficient and Scalable Paravirtual I/O System," 2013 USENIX Annual Technical Conference (USENIX ATC '13), Jun. 26-28, San Jose CA., USENIX Association, pp. 231-242.

* cited by examiner

DATA CHANNEL BETWEEN A CLIENT AND A RESTARTABLE SERVICE

BACKGROUND

A computing client often makes use of a service that the client expects to be available. In one common case, the service is a kernel module or a user-level application and the client is a virtual machine. A client makes use of the service by making requests and receiving responses over a communication channel between the client and the service. However, if the service fails, the state of the communication channel between the client and the service is lost. The service can easily be restarted, but after restart, the client has to reconstruct the state of the channel by determining the requests that were outstanding and possibly reissue those requests, even if the requests had already been processed by the service. This often causes a failure of an application running on the client and is not acceptable in many production use cases.

DETAILED DESCRIPTION

Embodiments provide a new technique of data communication between a client and a service such that the service can restart a data communication channel with the client after failure of the server, and continue to transfer data through the data communication channel. As a result, the following benefits are achieved.

More robust system. When the server crashes and restarts, client operation is not interrupted.

Live server upgrade. It is possible to upgrade the server binary and restart it to finish the upgrade without stopping or even quiescing the client.

More supportable system. When server has non-fatal problems (such as memory leaks), simply restarting the server will fix the problem.

Figure 1:
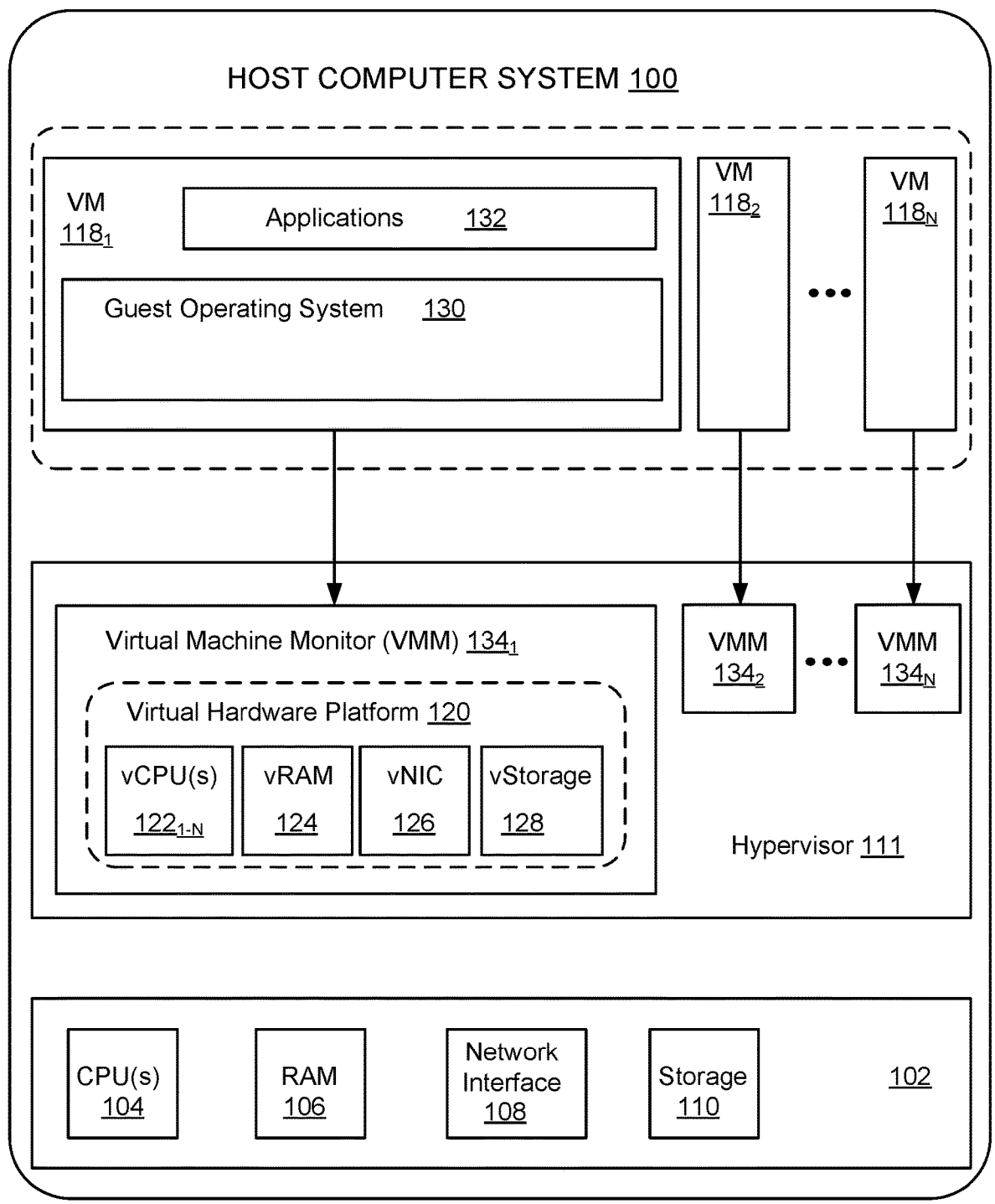
FIG. 1 depicts a block diagram of a host computer system, which is representative of a virtualized computer architecture.

FIG. 1 depicts a block diagram of a host computer system 100, which is representative of a virtualized computer architecture in which some embodiments may be practiced. As illustrated, computer system 100 hosts multiple virtual machines (VMs) $118_1$-$118_N$ that run on and share a common hardware platform 102. Hardware platform 102 includes conventional computer hardware components, such as one or more central processing units (CPUs) 104, random access memory (RAM) 106, one or more network interfaces 108, and a persistent storage 110 or alternatively, an interface to persistent storage, e.g., a storage array implemented in a storage area network.

A virtualization software layer, referred to herein after as a hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by virtual machine monitors (VMMs) 134. Each VMM $134_1$-$134_N$ is assigned to and monitors a corresponding VM $118_1$-$118_N$. In one embodiment, hypervisor 111 runs on top of hardware 102. In an alternative embodiment, hypervisor 111 runs on top of a host operating system which itself runs on hardware platform 102.

After instantiation, each VM $118_1$-$118_N$ encapsulates a virtual computing machine platform 120 that is executed under the control of its corresponding VMM. Virtual hardware platform 120 of VM 118, for example, includes but is not limited to such virtual devices as one or more virtual CPUs (vCPUs) $122_1$-$122_N$, a virtual random access memory (vRAM) 124, a virtual network interface adapter (vNIC) 126, and virtual storage (vStorage) 128. The virtual hardware platform 120 supports the installation of a guest operating system (guest OS) 130, which is capable of executing applications 132. Examples of guest OS 130 include any of the well-known operating systems, such as Microsoft Windows®, Linux®, and the like.

Figure 2A:
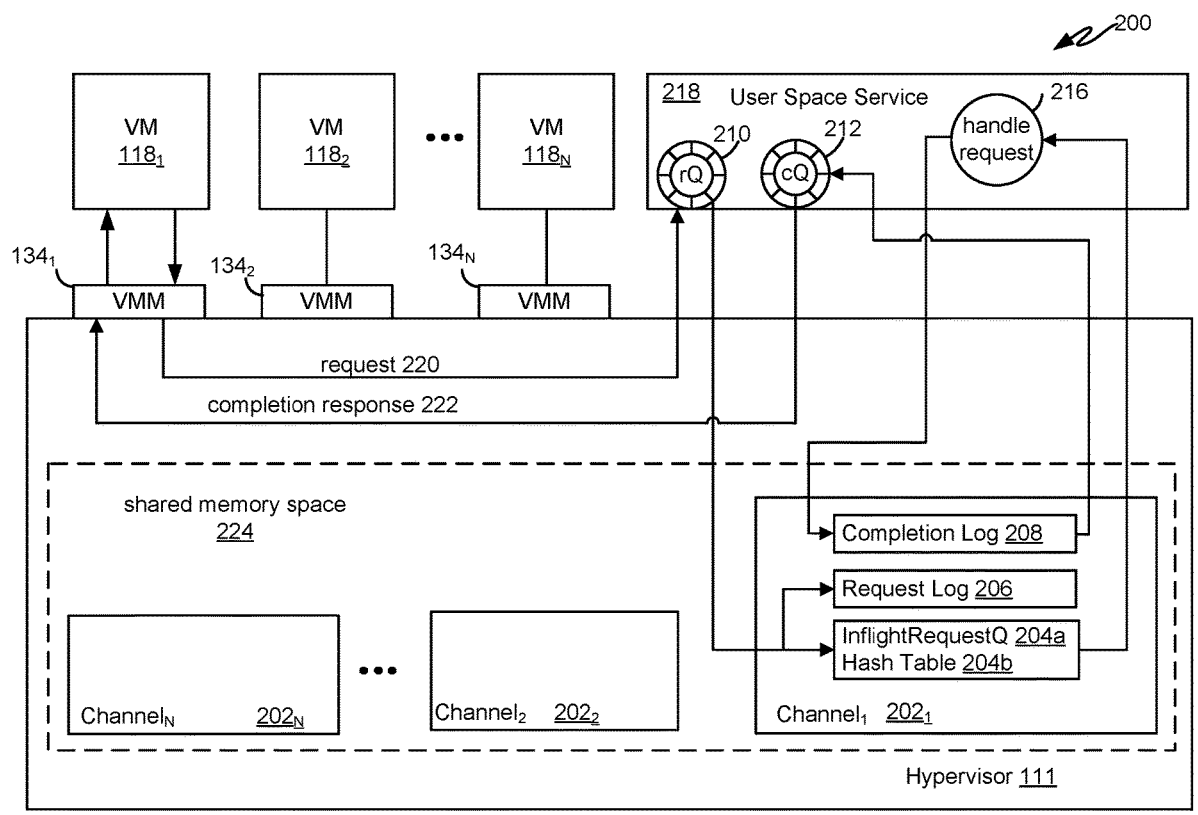
FIG. 2A depicts the data structures used in an embodiment.

FIG. 2A depicts data structures used in the embodiments, where a client communicates with a service. In the case depicted, the client is one of virtual machines $118_1$-$118_N$ and the service is a service 218 running in the user space supported by hypervisor 111. In another example, the service can be a hypervisor module. Communication between the client and the service is managed using a request queue (rQ) 210, a completion queue (cQ) 212, and data structures for one of communication channels $202_{1-N}$ maintained in shared memory space 224. In one embodiment, request queue 210 and completion queue 212 are ring buffers operating as FIFO queues. Such a ring buffer can be implemented as a finite list with head and tail pointers moving in tandem and wrapping around from the end of the list to the front of the list. Data structures for each communication channel $202_{1-N}$ includes a request log 206, a completion log 208 and an inflight request queue 204a, which has an optional associated hash table 204b for quickly locating items in inflight request queue 204a. By having the data structures for communication channels $202_{1-N}$ reside in shared memory space 224, they are protected from data loss in the event that service 218 fails. This is achieved by allocating a named shared memory (for example, using a shm_open POSIX call) to store all state of the channel and re-open the named shared memory when the service is restarted. Protecting these data structures is sufficient to allow service 218 to resume operation with the client, as if service 218 had not failed.

In addition, service 218 itself is modified to handle duplicate requests correctly (i.e., to maintain idempotency). That is, if a second identical request is received, its handling and results should be the same as the handling and results of the first request. This is achieved by service 218 recording an ID for the request and corresponding results in a logical log of service 218. By checking the log and discovering a duplicate request, service 218 can thus return identical results.

Referring back to FIG. 2A, the client makes a request for service 218 by enqueuing a request from the client (e.g., request 220) at the tail of request queue 210. Service 218 obtains a request from the head of request queue 210 and enqueues it in inflight request queue 204a, and then handles the request from inflight request queue 204a. Service 218 provides a completion response 222 via completion queue 212 after handling the request. If service 218 runs into an unexpected error and fails, service 218 executes a graceful shutdown, by placing completion log 208 into a known state. When service 218 is restarted, service 218 executes a recovery and resumes processing of the requests in inflight request queue 204.

Figure 2B:
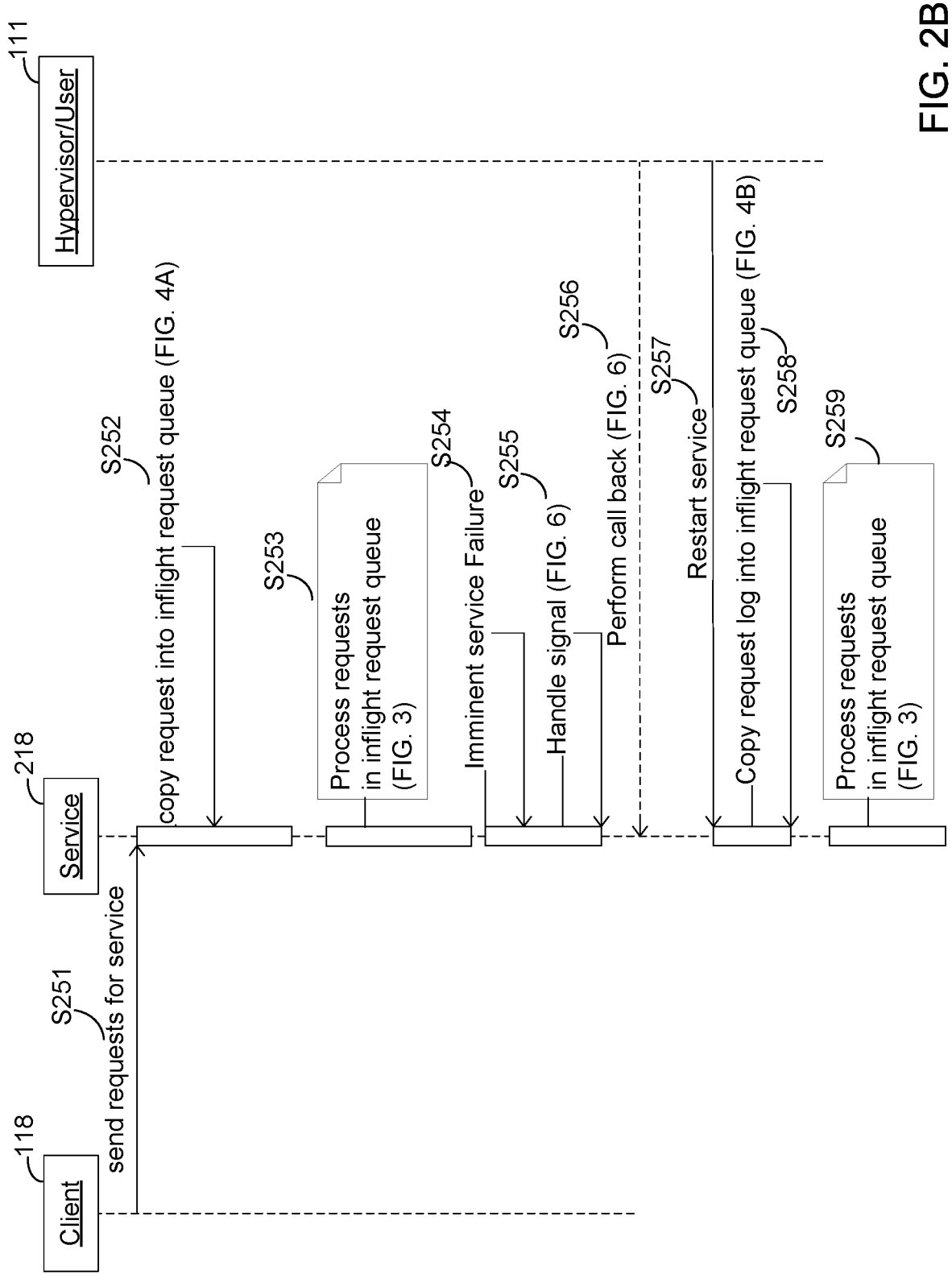
FIG. 2B depicts an example sequence of events for the client, the service and the hypervisor/users, according to an embodiment.

FIG. 2B depicts an example sequence of events for the client, service 218 and the hypervisor/user 111. In step S251, the client sends one or more requests to service 218. In step S252, service 218 copies the requests into inflight request queue 204a according to the steps of FIG. 4A described below. In step S253, service 218 processes the requests in inflight request queue 204a in accordance with the steps of FIG. 3 described below and, while doing so, encounters an indication, such as a flag, of an imminent failure of service 218 in step S254. In step S255, service 218 executes a signal handler to put completion queue 212 into a known state, in accordance with the steps of FIG. 6 described below. Alternatively, hypervisor 111 in step S256 invokes a call back function to put completion queue 212 into a known state. In step S257, hypervisor 111 or user restarts service 218, in accordance with the steps of FIG. 4B described below. In response, service 218 in step S258, copies requests from request log 206 into inflight request queue 204a according to the steps of FIG. 4B described below and in step S259, resumes processing requests in inflight request queue 204a, in accordance with the steps of FIG. 3 described below.

Figure 3:
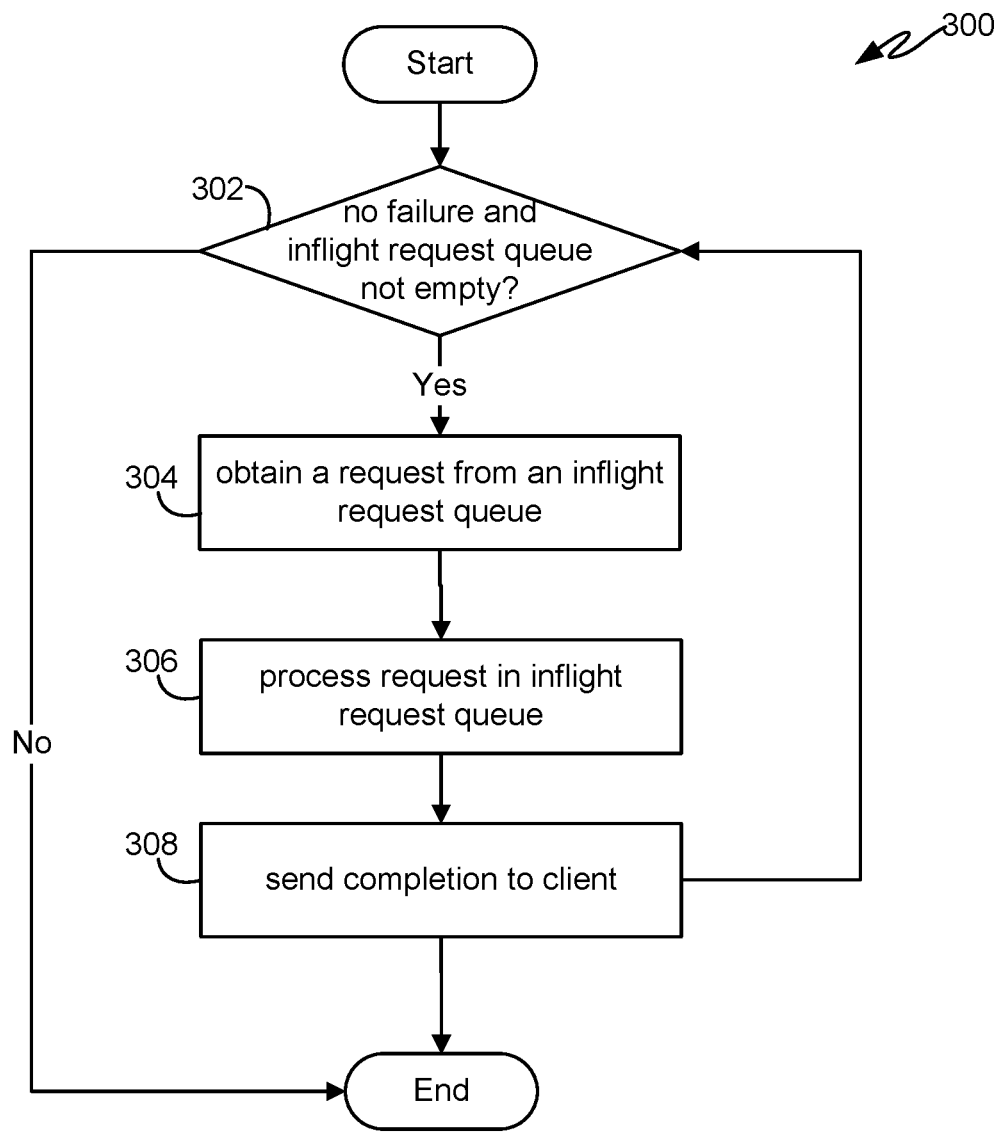
FIG. 3 depicts steps for processing a request obtained from an inflight request queue of a communication channel, according to an embodiment.

FIG. 3 depicts steps 300 for processing a request obtained from the head of inflight request queue 204a of communication channel $202_1$. In step 302, service 218 determines whether there is a failure that is imminent and whether inflight request queue 204a is not empty. In one embodiment, a flag is set to indicate that a failure is imminent. If there is no imminent failure and inflight request queue 204a has requests, then in step 304, service 218 obtains a request from the head of inflight request queue 204a and processes the request according to its content in step 306. In step 308, service 218 sends completion response 222 to the client, details of which are described in FIG. 6.

Figure 4A:
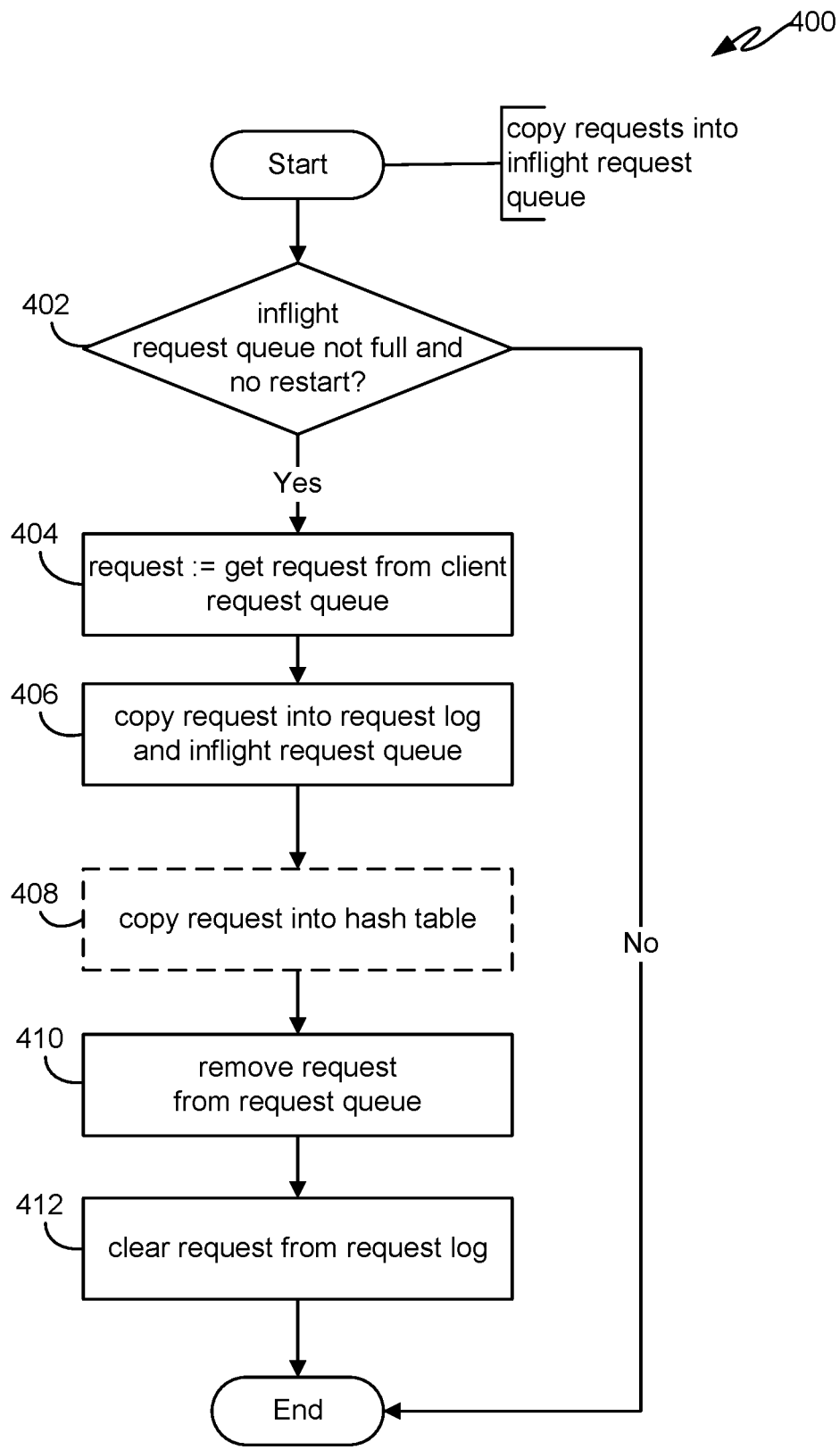
FIG. 4A depicts steps for copying a client request into the inflight request queue, according to an embodiment.

FIG. 4A depicts steps 400 for copying a client request 220 into the tail of inflight request queue 204a. In step 402, service 218 determines whether or not inflight request queue 204a is not full and no service restart has occurred. If the inflight queue is full, then the service does not copy requests into the inflight queue, but continues to service the requests. In one embodiment, the service includes a first thread that services the requests at the head of the inflight request queue and a second thread that copies requests into the end of the inflight queue and each thread runs when it is not blocked. In this embodiment, the second thread becomes blocked when the inflight queue is full and simply waits until a slot in the inflight queue becomes available. Assuming that the inflight request queue is not full, then in step 404, service 218 obtains a request from a request queue 210. In step 406, service 218 copies the request from request queue 210 into request log 206 and into inflight request queue 204. In step 408, which is an optional step, service 218 also copies the request into its hash table 204b based on a key, which is generated by performing a hash operation on the request. This step can speed up step 504. In step 410, service 218 removes the request from request queue 210 and, in step 412, service 218 removes the request from request log 206. By maintaining request log 206, service 218 ensures that updates to inflight request queue 204a and hash table 204b are atomic.

Figure 4B:
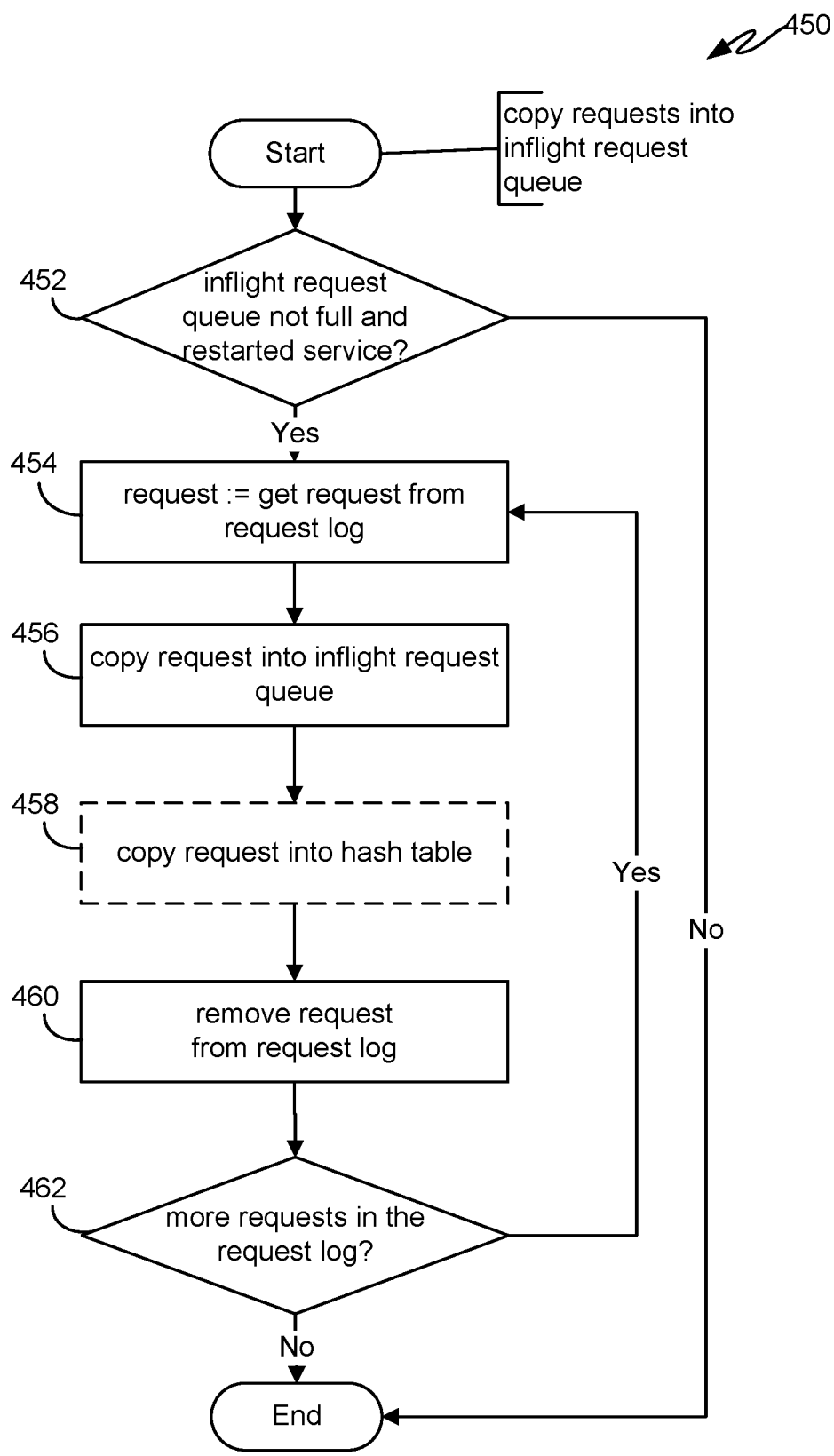
FIG. 4B depicts steps for copying a client request into the inflight request queue upon a restart of a failed service, according to an embodiment.

FIG. 4B depicts steps 450 for copying a client request into inflight request queue 204a upon a restart of a failed service. In step 452, service 218 determines that it has been restarted and whether inflight request queue 204a is not full. If it has been restarted and the inflight request queue 204a is not full, then in step 454, service 218 gets a request from request log 206. In step 456, service 218 copies the request into inflight request queue 204a and optionally into hash table 204b in step 458. In step 460, service 218 removes the request from request log 206. In step 462, service 218 tests whether there are more requests in request log 206 and if so repeats the steps 454, 456, 458, 460. Thus, after being restarted following a failure, service 218 copies requests from request log 206 into inflight request queue 204a, rather than from request queue 210. This guarantees that requests not yet copied into inflight request queue 204a will be serviced, without having to re-obtain these same requests from the client.

Figure 5:
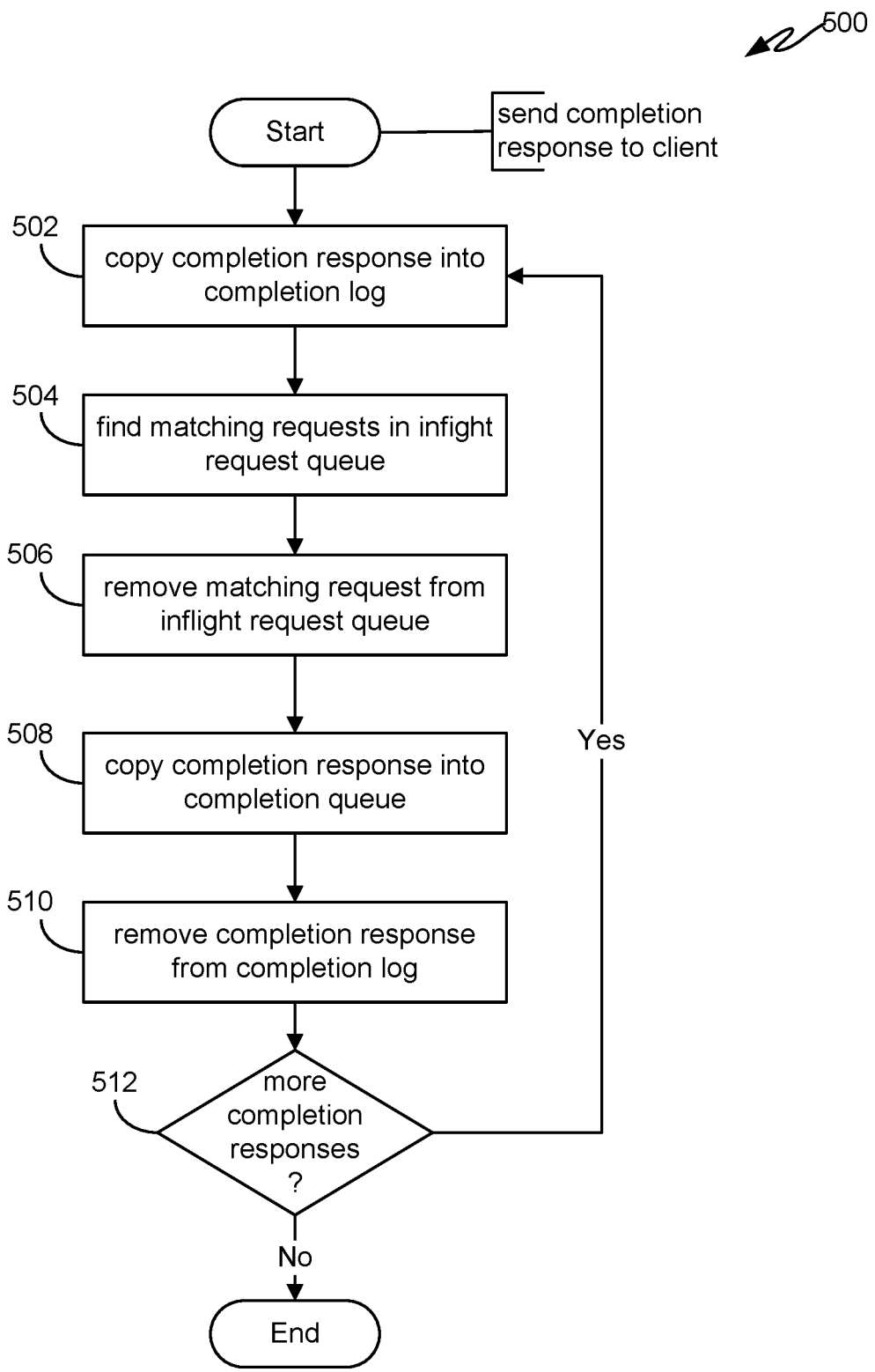
FIG. 5 depicts steps for sending a completion to a client, according to an embodiment.

FIG. 5 depicts steps for sending completion response 222 to the client. In step 502, service 218 copies completion response 222 into completion log 208. In step 504, service 218 finds the request that matches completion response 222 from hash table 204b, if available for inflight request queue 204a, using the id of the request to find the matching request. Otherwise, without the hash table 204b, service 218 searches inflight request queue 204a to find the matching request. In step 506, service 218 removes the matching requests from inflight request queue 204a, and from the hash table 204b if present. This maintains the correctness of inflight request queue 204a and hash table 204b. In step 508, service 218 copies completion response 222 into the completion queue 212 and in step 510, service 218 removes completion response 222 from completion log 208. The service repeats steps 402-410 if as determined in step 512 there are more completion responses to be sent.

Figure 6:
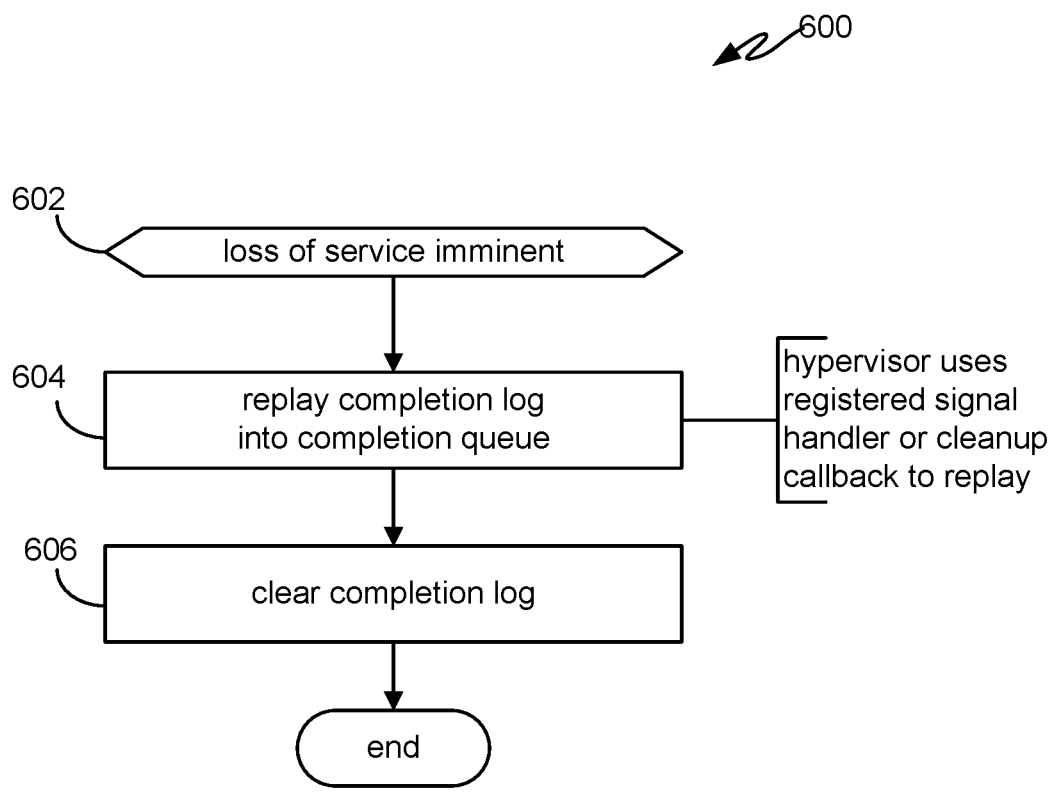
FIG. 6 depicts steps for preparation of an imminent exit or failure of the service, according to an embodiment.

FIG. 6 depicts steps for preparation of an imminent exit or failure of service 218. The steps include detecting that failure of service 218 is imminent in step 602, service 218 replaying completion log 208 in step 604 into the completion queue 212 and then clearing it in step 606 to leave completion log 208 in an empty state and the completion queue 212 in a consistent state with respect to the completion log. Either a signal handler or the hypervisor can perform the steps of FIG. 6. Having a signal handler perform the steps is preferred if service 218 has a chance to handle a signal, because only the service is needed to handle the signal, not the hypervisor. Alternatively, having hypervisor 111 perform a callback is preferred if service 218 cannot or is unable to handle a signal because then leaving the completion queue in a known state is guaranteed. However, this requires modification of the hypervisor.

Figure 7:
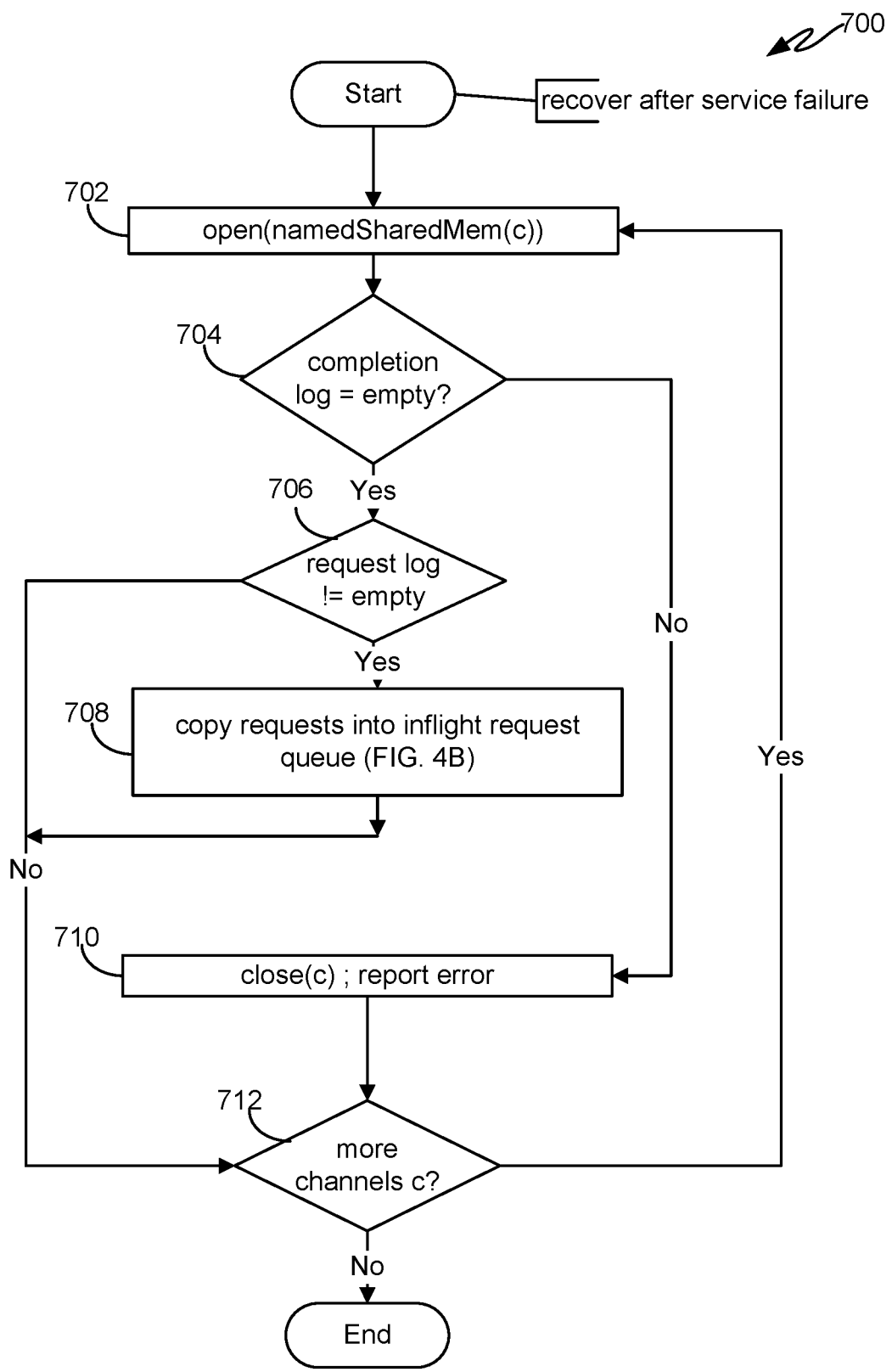
FIG. 7 depicts steps for recovery after an unexpected loss of the service, according to an embodiment.

FIG. 7 depicts steps for recovery after an unexpected loss or failure of service 218. Upon the occurrence of loss or failure of service 218 and restart of service 218, service 218 in step 702 opens the communication channel that has been closed due to failure. For the opened communication channel, in this example, communication channel $202_1$, service 218 determines in step 704 whether completion log 208 is empty. The completion log 208 will be empty if service 218 performed the steps of FIG. 6. If completion log 208 is not empty, then an error has occurred and service 218 in step 710 closes communication channel $202_1$ and reports the error. If completion log 208 is empty, then in step 706, service 218 tests to determine if request log 206 is not empty. If request log 206 is not empty, then service 218 processes each request in request log 206 by performing the steps of FIG. 4B, as indicated in step 708. Otherwise, having placed all of the requests into inflight request queue 204a for the opened communication channel $202_1$, service 218 tests whether there are any more communication channels to open. If so, then steps 702, 704, 706 and 708 are repeated for each communication channel.

As a result, embodiments described herein allow for a service failure and service restart without affecting a client using the service. The techniques described herein are especially useful where clients are non-network virtual devices, such as virtual storage devices, which typically do not perform retries when a service fails.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

As described above, the use of data structures of communication channels $201_{1-N}$ in shared memory space 224 saves the state of the communication channels after failure of service 218, and allows service 218 to resume without the client being aware of the failure.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for handling client requests from a client for a process, comprising:
  prior to the process encountering a failure:
    maintaining a request log and an inflight request queue in a protected memory region that is a shared memory space supported by a hypervisor running in a computing device, the request log and inflight request queue for storing requests that are preserved even when the process encounters the failure;
    copying a plurality of requests from a client request queue into the request log and the inflight request queue;
    directly in response to completing copying of a request of the plurality of requests into both the inflight request queue and the request log, removing the request from the request log and the client request queue; and
    servicing one or more of the plurality of requests out of the inflight request queue; and
  upon the process being restarted following the failure of the process:
    determining whether the request log contains one or more requests and, if so, copying the one or more requests from the request log into the in-flight request queue and then removing the copied one or more requests from the request log; and
    processing the one or more requests in the in-flight request queue, wherein the one or more requests include any that were in the in-flight request queue when the failure of the process was encountered and any that were copied from the request log.

2. The method according to claim 1, wherein the plurality of requests are also copied into a hash table associated with the inflight request queue, and each request of the plurality of requests is indexed in the hash table according to a hash thereof.

3. The method according to claim 2, wherein the request is removed from the client request queue and the request log after the request is copied into the inflight request queue and the hash table.

4. The method according to claim 1, further comprising, upon completing the processing of a (liven request by the process, sending a completion response to the client.

5. The method according to claim 4, wherein sending the completion response to the client includes:
copying the completion response to the given request into a completion log, which is also maintained in the protected memory region;
removing the given request corresponding to the completion response from the inflight request queue;
copying the completion response into a completion queue; and
after copying the completion response into the completion queue, removing the completion response from the completion log.

6. The method according to claim 5, wherein the plurality of requests are also copied into a hash table associated with the inflight request queue when the plurality of requests are copied into the inflight request queue, and
prior to removing the request from the inflight request queue, the hash table associated with the inflight request queue is used to find the request.

7. The method according to claim 1, wherein the client is a virtual machine supported by the hypervisor.

8. The method according to claim 7, wherein the process is a user space process supported by the hypervisor.

9. The method according to claim 7, wherein the process is a module within the hypervisor.

10. The method of claim 1, wherein the protected memory region is a POSIX shared memory object.

11. A non-transitory computer readable storage medium containing instructions that configure a processor of a computing device to carry out a method for handling client requests from a client for a process, the method comprising:
prior to the process encountering a failure:
maintaining a request log and an inflight request queue in a protected memory region that is a shared memory space supported by a hypervisor running in the computing device, the request log and inflight request queue for storing requests that are preserved even when the process encounters the failure;
copying a plurality of requests from a client request queue into the request log and the inflight request queue;
directly in response to completing copying of a request of the plurality of requests into the inflight request queue and the request log, removing the request from the request log and the client request queue; and
servicing one or more of the plurality of requests out of the inflight request queue; and
upon the process being restarted following the failure of the process:
determining whether the request log contains one or more requests and, if so, copying the one or more requests from the request log into the in-flight request queue and then removing the copied one or more requests from the request log; and
processing the one or more requests in the in-flight request queue, wherein the one or more requests include any that were in the in-flight request queue when the failure of the process was encountered and any that were copied from the request log.

12. The non-transitory computer readable storage medium according to claim 11, wherein the plurality of requests are also copied into a hash table associated with the inflight request queue, and each request of the plurality of requests is indexed in the hash table according to a hash thereof.

13. The non-transitory computer readable storage medium according to claim 12, wherein the request is removed from the client request queue and the request log after the request is copied into the inflight request queue and the hash table.

14. The non-transitory computer readable storage medium according to claim 10, wherein the method further comprises upon completing the processing of a given request by the process, sending a completion response to the client.

15. The non-transitory computer readable storage medium according to claim 14, wherein sending the completion response to the client includes:
copying the completion response to the given request into a completion log, which is also maintained in the protected memory region;
removing the given request corresponding to the completion response from the inflight request queue;
copying the completion response into a completion queue; and
after copying the completion response into the completion queue, removing the completion response from the completion log.

16. The non-transitory computer readable storage medium according to claim 15,
wherein the plurality of requests are also copied into a hash table associated with the inflight request queue when the plurality of requests are copied into the inflight request queue, and
prior to removing the request from the inflight request queue, the hash table associated with the inflight request queue is used to find the request.

17. The non-transitory computer readable storage medium of 11, wherein the protected memory region is a POSIX shared memory object.

18. A system comprising:
a processor; and
a memory coupled to the processor and containing instructions to configure the processor to run a hypervisor that supports one or more virtual machines and a user space process,
the memory including a protected memory region that is a shared memory space supported by the hypervisor in which the hypervisor maintains a request log and an inflight request queue, the request log and the inflight request queue for storing requests that are preserved in the protected memory region even when the user space process encounters a failure;
wherein, prior to the user space process encountering the failure:
the user space process copies a plurality of requests from a client request queue into the request log and the inflight request queue;
directly in response to completing copying of a request of the plurality of requests into the inflight request queue and the request log, the user space process removes the request from the request log and the client request queue; and the user space process processes one or more of the plurality of requests out of the inflight request queue; and wherein, when the user space process is restarted following the failure thereof, the user space process:

determines whether the request log contains one or more requests and, if so, copies the one or more requests from the request log into the in-flight request queue and then removes the copied one or more requests from the request log; and processes the one or more requests in the in-flight request queue, wherein the one or more requests include any that were in the in-flight request queue when the failure of the user space process was encountered and any that were copied from the request log.

19. The system according to claim 18, wherein the user space process, upon completing the processing of a given request, sends a completion response to a client by:

copying the completion response to the given request into a completion log, which is also maintained in the protected memory region;

removing the given request corresponding to the completion response from the inflight request queue;

copying the completion response into a completion queue; and after copying the completion response into the completion queue, removing the completion response from the completion log.

20. The system of 18, wherein the protected memory region is a POSIX shared memory object.

* * * * *